United States Patent [19]
Emberson

[11] 3,809,411
[45] May 7, 1974

[54] DRAIN FITTING
[76] Inventor: John Ernest Emberson, 25 Dogwood Cres., Scarborough, Ontario, Canada
[22] Filed: Feb. 20, 1973
[21] Appl. No.: 334,113

[52] U.S. Cl. ................................................ 285/42
[51] Int. Cl. ............................................. E04b 5/48
[58] Field of Search ............ 285/42, 238, 239, 158, 285/58, 59, 60, 56, 339

[56] References Cited
UNITED STATES PATENTS

| 990,646 | 4/1911 | Fisher | 285/56 |
|---|---|---|---|
| 2,740,490 | 4/1956 | Matheis | 285/42 X |
| 2,899,690 | 8/1959 | Clifford | 285/60 |
| 3,420,552 | 1/1969 | Mork | 285/42 |
| 3,481,632 | 12/1969 | Suess | 285/42 |
| 3,701,552 | 10/1972 | Cowan | 285/158 |

Primary Examiner—Alfred R. Guest
Attorney, Agent, or Firm—Ridout & Maybee

[57] ABSTRACT

A drain assembly for connecting plastic drain pipes to metal drain structural components comprises a metal body which is secured to a floor or roof structure, with relatively rigid plastic conduit parts attached thereto and making sealing contact therewith. The plastic parts of the assembly include a conduit extending through the metal body, a plastic collar fitting tightly between the metal body and the plastic conduit, and secured thereto e.g. by spot welding. A sealing ring is provided between a lower inward flange on the metal body, the plastic conduit and the lower edge of the plastic collar which bears down on and compresses the sealing ring to effect liquid seal between the metal and plastic parts.

6 Claims, 2 Drawing Figures

DRAIN FITTING

BACKGROUND OF THE INVENTION

This invention relates to a drain assembly for installation in floors, roofs, bases and other surfaces requiring liquid drains therefrom, utilizing both metal and plastic parts.

Plastics of the relatively rigid kind, for example PVC plastics, ABS plastics, high impact polystyrenes and the like, show many advantages in forming conduits for liquids as compared with metals conveniently used. They are lighter, easier to shape, mold and work, sufficiently impervious to liquids, and not subject to corrosive attack. Consequently, they are finding more and more application in liquid conduits and plumbing fixtures in buildings. However, for some applications they are not structurally strong enough. In drain fittings, for example, it is required to have a load-bearing drain structure mounted on the base to be drained, which can withstand all of the forces to which the base is subjected in use. For this purpose, metals are most suitable.

A problem then arises, of connecting the plastic pipes to the metal drain structure, in a satisfactory sealing, permanent manner. Sealing connections of metal to metal, and sealing connections of plastic to plastic, are simple and well known. Sealing connection of metal to plastic in a satisfactory manner presents a problem.

BRIEF SUMMARY OF THE INVENTION

It is an object of the present invention to provide a drain fitting involving plastic and metal parts, adapted to sealingly engage and cooperate with one another.

It is a further object to provide a drain fitting involving sealingly engaging metal and plastic parts which can be readily, simply and cheaply assembled on site.

Other objects of the invention will be apparent from the following description.

Briefly, the drain assembly of the invention has a metal body adapted to be secured to the surface to be drained, and having a conduit portion adapted to extend downwardly through the surface. A plastic conduit extends into the metal body through an aperture in the bottom thereof. The lower end of the plastic conduit extends freely below the metal body and allows for connecting of plastic pipes thereto. Fitting tightly in the space between the plastic conduit and the metal body is a sealing ring and a plastic collar, which compresses the sealing ring to form a seal. The plastic collar is permanently or semi-permanently attached to the plastic conduit after assembly. An inwardly projecting flange on the metal body provides a seat for the sealing ring and an abutment for the plastic collar, to keep the parts in assembled relationship.

As will appear from the following detailed description, the drain fitting of the invention is relatively simple and cheap. It can be easily assembled and completed on site, by non-skilled or semi-skilled workmen. It provides good liquid seal allowing a standard form of floor or roof drain to be used with plastic piping.

BRIEF DESCRIPTION OF THE DRAWINGS

In the accompanying drawings.

In the drawings, like reference numerals indicate like parts.

DETAILED DESCRIPTION

Figure 1:
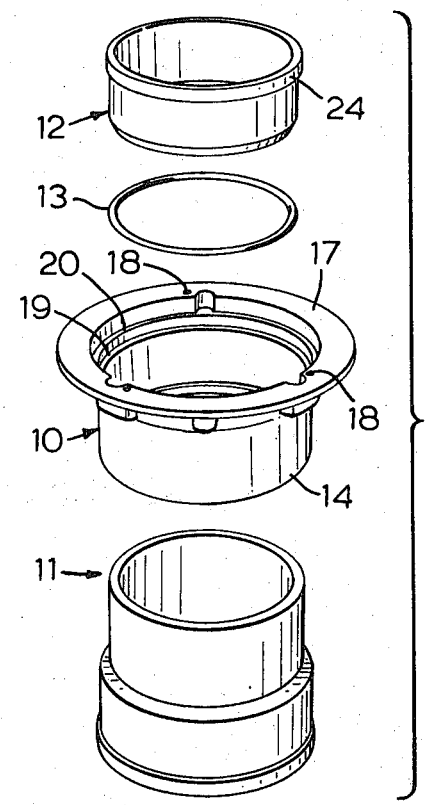
FIG. 1 is an exploded perspective view of a drain fitting according to a preferred embodiment of the invention.

With reference to the accompanying drawings, the drain fitting therein illustrated comprises a rigid metal body 10, a plastic conduit 11 adapted to fit partially within the metal body 10, a plastic collar 12 adapted to fit within the metal body 10, and a resilient sealing ring 13.

The metal body 10 is suitably a 1-piece casting, of steel, suitably painted or coated to resist corrosion. It is generally circular in cross-section. It consists of a tubular conduit portion 14, which extends generally downwardly after installation. An integral inwardly extending peripheral flange 15 (best seen in FIG. 2) is provided at the bottom end of conduit portion 14. The inner surface 16 of the flange 15 defines an aperture which is the narrowest portion of the passageway through the body 10.

At its upper end, the body 10 has an integral outwardly extending flange 17. The flange 17, on installation, is secured to the roof, floor, base etc. from which water is to be drained, and it is arranged that the floor level be substantially flush with the upper surface of flange 17. For such installation, the flange 17 is provided with securing means such as blind screw threaded bolt holes 18. Also near its upper end, the body 10 is provided with internal peripheral step formations 19, 20.

The plastic conduit 11 is of generally circular cross-section and is a 1-piece molding of substantially rigid plastic. It has a narrow upper section 21 and a broad lower section 22, between which is an outwardly presented shoulder 23. The outer dimension of the narrow section 21 is such that it is a close fit in the aperture in metal body 10 defined by internal surface 16 of flange 15. The broad section 22 will not pass through this aperture.

The plastic collar 12 is of generally circular cross-section and is of substantially rigid plastic, preferably the same material as constitutes the plastic conduit 11. It is dimensioned so that it is a close sliding fit over the narrow section 21 of the plastic conduit 11, and a snug fit inside the conduit portion 14 of the metal body 10. At its upper end, the plastic collar 12 is provided with a thickened peripheral portion forming a lip 24 extending outwardly around the outer surface thereof, which cooperates with the step formation 19 in the metal body 10, on assembly, as hereinafter described.

The sealing ring 13 is an O-ring, dimensioned to fit closely within conduit portion 14 of the metal body 10. It is made of resilient material, preferably of an oil resistant rubber.

Figure 2:
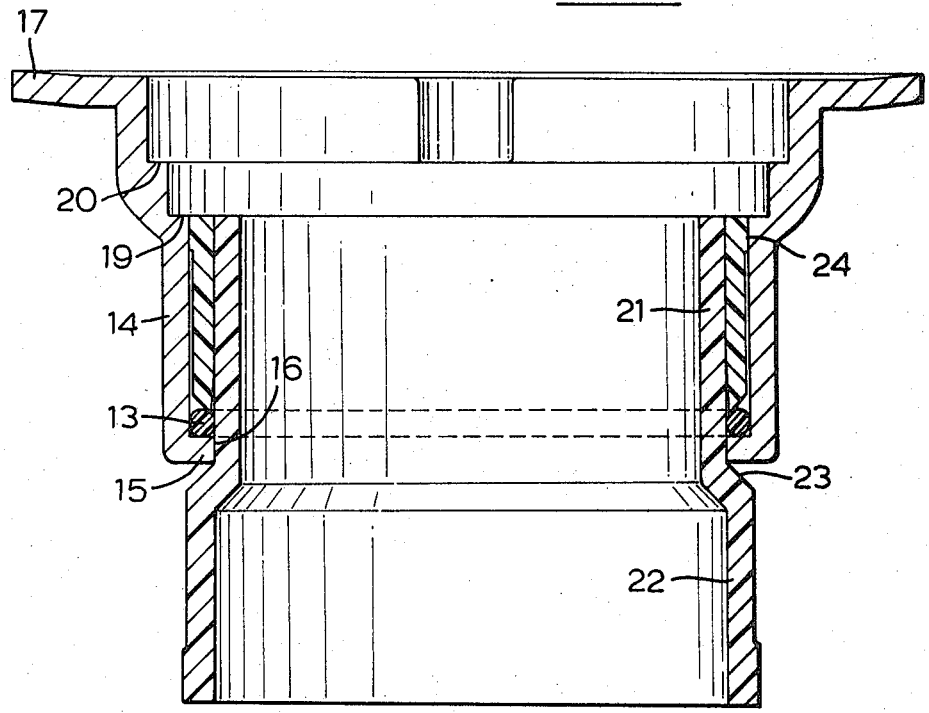
FIG. 2 is a vertical cross-sectional view through the assembled drain fitting of FIG. 1.

The drain fitting is shown assembled in FIG. 2. The metal body 10 is secured by flange 17 to the surface to be drained. Plastic conduit 11 is pushed up so that its narrow portion 21 extends into the metal body 10 and shoulder 23 comes into engagement with the inwardly extending flange 15 of the metal body 10. Next, sealing ring 13 is pushed down between metal body 10 and plastic conduit portion 21, to rest upon the inner surface of flange 15. Then, plastic collar 12 is forced down between metal body 10 and plastic conduit portion 21 so that its bottom end engages and exerts pressure on sealing ring 13, so that sealing ring 13 makes a liquid tight seal between the plastic and metal parts, 21,12 and 14.

The axial dimension of the plastic collar 12 is arranged so that step formation 19 on the metal body 10 engages in the bottom of lip 24 and the collar 12 when the bottom edge of collar 12 first engages sealing ring 13. The lip 24 is a tight interference fit inside the metal conduit portion 14, so that forcing collar 12 further down to compress sealing ring 13 creates another position of close, partially sealing engagement between the plastic and metal parts. This interference fit is arranged to be so tight that excessive downward force exerted by the assembler on collar 12 does not damage sealing ring 13.

Having assembled the drain fitting in this manner, the installation is completed by securing the plastic collar 12 to the narrow section 21 of the plastic conduit 11. This can be simply accomplished on site, for example by ultra-sonic welding at, perhaps, four spaced apart locations around the surfaces of contact of these plastic parts. Alternatively, such securing can be accomplished by solvent welding, e.g., by applying solvent to the inner surface of plastic collar 12 immediately prior to assembly. Any of these techniques are well known and can be practiced simply and quickly on site by non-skilled or semi-skilled personnel. The securing can be permanent in nature. It is designed merely to complete assembly of the drain, not to provide sealing, which is accomplished by the cooperation of parts with the sealing ring as previously described.

Other plastic parts, e.g. plastic drain and sewage pipes, can be connected in sealing engagement with the broad section 22 of the plastic conduit 11, depending from the metal body, such methods of sealingly connecting plastic to plastic are well known in the art, and include machined screw thread couplings, heat sealing, solvent welding and the like.

The above description and the accompanying drawings illustrate the preferred embodiment of the invention. However, many modifications in detail will be apparent, and the scope of the invention is limited only by the appended claims. What I claim as my invention is:

1. A drain fitting comprising:
   a rigid metal body having a conduit portion, an outwardly extending flange integral therewith at a first end of said conduit portion, and an inwardly extending integral flange on said conduit portion defining an aperture;
   a plastic conduit having integral narrow and broad sections the narrow section being shaped and dimensioned to fit closely within said aperture and the broad section being larger than said aperture;
   a plastic collar having internal shape and dimensions so as to be a close sliding fit around the narrow section of said plastic conduit and having external shape and dimensions so as to fit snugly inside the conduit portion of the metal body;
   a resilient sealing ring adapted to fit closely within the conduit portion of said metal body and rest upon the inner surface of said inwardly extending flange thereof.

2. The drain fitting of claim 1 wherein the conduit portion and aperture of the metal body, the plastic conduit and the plastic collar are all generally circular in cross-section, internally and externally, and the resilient sealing ring is an O-ring.

3. The drain fitting of claim 2 wherein the plastic collar is provided at its upper end with a peripheral outwardly extending lip, the dimension of which is such that it provides a tight interference fit with the inner surface of the conduit portion of the metal body.

4. A drain fitting assembly comprising:
   a rigid metal body having a conduit portion, an upper outwardly extending integral flange adapted to be secured to a surface, and a lower inwardly extending integral flange defining an aperture;
   a plastic conduit having an upper integral narrow section closely fitting and extending through said aperture into the conduit portion of the metal body, a lower broad section extending below the metal body, and a shoulder therebetween engaging the inner periphery of said flange;
   a resilient sealing ring fitted closely within the conduit portion of said metal body and closely around the narrow section of said plastic conduit, and seated on said lower flange;
   a plastic collar closely fitted between the conduit portion of said metal body and the narrow section of said plastic conduit, the lower end of said plastic collar compressing the sealing ring so as to cause it to seal between the metal body and plastic conduit;
   the plastic collar being secured to the plastic conduit.

5. The drain fitting assembly of claim 4 wherein the plastic collar is secured to the plastic conduit by ultra-sonic spot welding.

6. The drain fitting assembly of claim 4 wherein the plastic collar is secured to the plastic conduit by solvent welding.

* * * * *